(12) United States Patent
Van Kessel

(10) Patent No.: US 9,550,868 B2
(45) Date of Patent: Jan. 24, 2017

(54) PIGMENT MASTERBATCH

(71) Applicant: INNOSOLIDS B.V., Geleen (NL)

(72) Inventor: Theo Van Kessel, Geleen (NL)

(73) Assignee: INNOSOLIDS B.V., Geleen (NL)

( * ) Notice: Subject to any disclaimer, the term of this patent is extended or adjusted under 35 U.S.C. 154(b) by 0 days.

(21) Appl. No.: 14/913,433

(22) PCT Filed: Aug. 29, 2014

(86) PCT No.: PCT/EP2014/068419
§ 371 (c)(1),
(2) Date: Feb. 22, 2016

(87) PCT Pub. No.: WO2015/028633
PCT Pub. Date: Mar. 5, 2015

(65) Prior Publication Data
US 2016/0208059 A1    Jul. 21, 2016

(30) Foreign Application Priority Data

Aug. 30, 2013    (EP) ..................................... 13182482

(51) Int. Cl.
*C08J 3/20*    (2006.01)
*C08J 3/22*    (2006.01)
*C08K 5/00*    (2006.01)

(52) U.S. Cl.
CPC .............. *C08J 3/226* (2013.01); *C08K 5/0008* (2013.01); *C08K 5/0041* (2013.01); *C08J 2323/14* (2013.01); *C08J 2327/06* (2013.01); *C08J 2367/02* (2013.01)

(58) Field of Classification Search
CPC ................................ C08J 3/226; C08J 2323/14
See application file for complete search history.

(56) References Cited

U.S. PATENT DOCUMENTS

| 4,057,672 A | 11/1977 | Creekmore et al. |
| 4,072,790 A | 2/1978 | Creekmore et al. |
| 2013/0018137 A1 | 1/2013 | Seidel et al. |

FOREIGN PATENT DOCUMENTS

| WO | 2009 010673 A2 | 1/2009 |
| WO | 2012 084865 A1 | 6/2012 |

*Primary Examiner* — Hannah Pak
(74) *Attorney, Agent, or Firm* — Hudak, Shunk & Farine Co. LPA

(57) ABSTRACT

A pigment masterbatch, having a) 30-95 wt % of at least one pigment, b) 2-30 wt % of a compound A according to formula I,

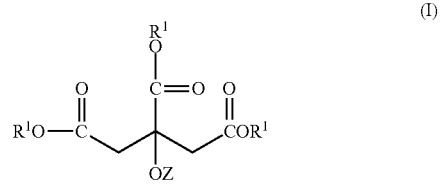

c) 1.0-10 wt % of a compound B according to formula $C_2H_4(NHC(O)R^3)_2$, and d) 1.5-20 wt % of a compound C, which contains at least one polyethyleneglycol moiety and at least one fatty acid moiety coupled to the polyethyleneglycol moiety, e) 0-50 wt % of a polymeric compound D, wherein $R^1$ is an alkyl group comprising 1-20 carbon atoms and Z is hydrogen or a group according to the formula $C(O)R^2$, wherein $R^2$ is an alkyl group comprising 1-20 carbon atoms, and wherein $R^3$ is a fatty acid moiety comprising 10-30 carbon atoms, and wherein the wt % are relative to the total weight of the pigment masterbatch.

19 Claims, No Drawings

PIGMENT MASTERBATCH

FIELD OF THE INVENTION

The invention relates to a pigment masterbatch, to a process for the preparation of a pigment masterbatch, to the use of a pigment masterbatch, to a process for the preparation of a polymer composition and to the polymer composition.

BACKGROUND OF THE INVENTION

A pigment masterbatch is a solid or liquid additive that is used for coloring a polymer composition. The masterbatch is a highly concentrated mixture of pigments and other components. The masterbatch is added to a polymer composition before and/or during extrusion of the polymer composition to obtain a colored polymer composition.

Masterbatches are described in, for example WO 2012/084865 and WO 2009/010673. WO 2012/084865 describes a masterbatch consisting of pigment and a mold release agent. The mold release agent is selected from the group consisting of low-molecular weight polyolefin oils, low-molecular weight polyolefin waxes, montan waxes and aliphatic or aromatic carboxylic acid esters of fatty acids and/or fatty alcohols.

WO 2009/010673 describes a process for the manufacturing of a masterbatch comprising the production of a mixture comprising at least one binder, at least one additive and/or at least one pigment and the pelletizing of said mixture. The binder can be chosen from several commercial waxes comprising alcohols or amides. Ethylene bis stearamide waxes are mentioned as an example.

In the prior art two types of pigment masterbatches are known. So called dry (or solid) masterbatches, which are in the form of powders or pellets, and so called liquid masterbatches, which are in the form of liquids. Dosing the dry masterbatches with a polymer composition to an extruder is relatively easy. However dosing a liquid masterbatch to a polymer composition in an extruder is cumbersome, gives rise to fouling of the working area and screw slip may occur, especially at higher loadings of liquid masterbatches. Furthermore liquid masterbatches tend to form agglomerates with flakes and/or powder resulting in clogging of the process equipment.

The pigment masterbatches of the prior art have a number of further disadvantages. In practice, for coloring different polymer compositions different pigment masterbatches must be prepared. Also coloring with pigment masterbatches can give the problem of non-uniform color distribution in the extrudate. Another problem is the change from one masterbatch to a different masterbatch on processing equipment. During this change cleaning of the equipment is necessary and cleaning of the equipment tends to take hours of time while making a lot of waste product.

SUMMARY OF THE INVENTION

It is an object of the present invention to prepare a universal masterbatch that can be applied in different types of polymer compositions.

This object is achieved by a pigment masterbatch, comprising
  a. 30-95 wt % of at least one pigment,
  b. 2-30 wt % of a compound A according to formula I,
  c. 1.0-10 wt % of a compound B according to formula $C_2H_4(NHC(O)R^3)_2$, and
  d. 1.5-20 wt % of a compound C, which contains at least one polyethyleneglycol moiety and at least one fatty acid moiety coupled to the polyethyleneglycol moiety,
  e. 0-50 wt % of a polymeric compound D
wherein $R^1$ is an alkyl group comprising 1-20 carbon atoms and Z is hydrogen or a group according to the formula $C(O)R^2$, wherein $R^2$ is an alkyl group comprising 1-20 carbon atoms, and wherein $R^3$ is a fatty acid moiety comprising 10-30 carbon atoms, preferably 16 to 22 carbon atoms.

The wt % are relative to the total weight of the pigment masterbatch.

DETAILED DESCRIPTION OF THE INVENTION

It has surprisingly been found that by using the pigment masterbatch comprising the ingredients according to the invention the pigment masterbatch can be dosed easily to processing equipment like for example an extruder or an injection molding machine and is dispersed easy and fast in a polymer composition during processing.

Furthermore the pigment masterbatch shows the advantage that an excellent color distribution in a colored polymer composition is obtained.

Another advantage is that processing equipment can be easily cleaned, during a short cleaning time. During cleaning a low amount of waste product is produced.

The masterbatch according to the invention acts like a dry-liquid colorant. For adding the masterbatch to the extruder or the injection molding machine, the masterbatch will be a solid, and can be easily handled. Once the masterbatch is in the processing equipment, the masterbatch will function like a liquid colorant and give excellent uniform coloring of the polymer composition to which the masterbatch is added.

The pigment masterbatch according to the invention comprises at least one pigment. In principle any pigment (either organic, inorganic or dyestuff) can be applied in the present invention. In general, pigments can have a biological, natural or chemical source. Examples of pigments from a biological source are alizarin, alizarin crimson, gamboge, cochineal red, rose madder, indigo and Indian yellow.

Pigments from a natural or chemical source can be organic or inorganic. A lot of the inorganic pigments are metal complexes.

Mixtures of more than one pigment can be used in the pigment masterbatch.

Examples of organic pigments are Tyrian purple, magenta, phthalo green, phthalo blue and pigment red 170.

Examples of inorganic pigments are:
  Cadmium pigments: cadmium yellow, cadmium red, cadmium green, cadmium orange
  Carbon pigments: carbon black (including vine blac, lamp black), ivory black (bone char)
  Chromium pigments: chrome yellow and chrome green
  Cobalt pigments: cobalt violet, cobalt blue, cerulean blue, aureolin (cobalt yellow)
  Copper pigments: Azurite, Han purple, Han blue, Egyptian blue, Malachite, Paris green, Phthalocyanine Blue BN, Phthalocyanine Green G, verdigris, viridian
  Iron oxide pigments: sanguine, caput mortuum, oxide red, red ochre, Venetian red, Prussian blue
  Clay earth pigments (iron oxides): yellow ochre, raw sienna, burnt sienna, raw umber, burnt umber.

Lead pigments: lead white, cremnitz white, Naples yellow, red lead

Mercury pigments: vermilion

Titanium pigments: titanium yellow, titanium beige, titanium white, titanium black Ultramarine pigments: ultramarine, ultramarine green shade Zinc pigments: zinc white, zinc ferrite The pigment is present in the masterbatch in an amount of 30-95 wt %. Preferably the amount of pigment is 40-90 wt %, more preferably 60-80 wt %.

The pigment masterbatch according to the invention comprises a compound A according to formula I,

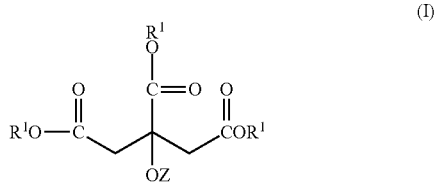

wherein $R^1$ is an alkyl group comprising 1-20 carbon atoms and Z is hydrogen or a group according to the formula —C(O)$R^2$, wherein $R^2$ is an alkyl group comprising 1-20 carbon atoms. $R^1$ can be the same or different and is an alkyl group comprising 1-20 carbon atoms, preferably 1-15 carbon atoms, more preferably 1-10 carbon atoms. $R^2$ is an alkyl group comprising 1-20 carbon atoms, preferably 1-10 carbon atoms, more preferably 1-5 carbon atoms.

Examples of compounds A are triethylcitrate, tributylcitrate, trihexylcitrate, acetyltributylcitrate, propanoyltributylcitrate, acetyltrihexylcitrate and butanoyltriethylcitrate. Preferably the compound A is chosen from tributylcitrate and acetyltri butylcitrate.

Compound A is present in the pigment masterbatch in an amount of 2-30 wt %, wherein the wt % are relative to the total weight of the masterbatch, preferably the amount of compound A in the masterbatch is 4-20 wt %, more preferably 5-15 wt %.

The pigment masterbatch according to the invention comprises a compound B according to formula $C_2H_4(NHC(O)R^3)_2$, wherein $R^3$ is a fatty acid moiety comprising 10-30 carbon atoms, preferably 16 to 22 carbon atoms. The fatty acid moieties can be saturated or unsaturated. Examples of these fatty acid moieties are oleate, laureate, stearate and palmitate. Examples of compound B are ethylenebisstearamide, ethylenebislaureamide and ethylenebisoleamide.

Compound B is present in the pigment masterbatch in an amount of 1-10 wt %, preferably the amount of compound B in the masterbatch is 1.5-6 wt %, more preferably 2-5 wt %.

When the amount of compound B in the pigment masterbatch is too low the processing of the pigment masterbatch may be difficult and dispersion of the pigment in a polymer composition may not be optimal. When the amount of compound B in the pigment masterbatch is too high the pigmented polymer composition may show blooming.

The pigment masterbatch according to the invention comprises a compound C, which contains at least one polyethyleneglycol moiety and at least one fatty acid moiety coupled to the polyethyleneglycol moiety. The polyethyleneglycol moiety comprises between 5 to 25 ethyleneglycol repeating units, preferably 8 to 24 ethylene glycol repeating units. The fatty acid moieties can be saturated or unsaturated and can contain 10 to 30 carbon atoms, preferably 16 to 22 carbon atoms. Examples of these fatty acid moieties are oleate, laureate, stearate, palmitate and ricinoleate. Examples of compound C include PEG 300 mono-oleate, PEG 300 di-oleate, PEG 300-monostearate, PEG 300-distearate, PEG 400 dioleate, PEG 400 distearate, PEG 400 monolaurate, PEG 400 monooleate, PEG 400 monoricinoleate, PEG 400 monostearate.

A specific preferred example of compound C is an ethoxylated sorbitan ester. The ethoxylated sorbitan ester comprises a sorbitan group which is substituted by four polyethylene glycol substituents. The ethoxylated sorbitan ester can preferably comprise 14 to 26 ethylene glycol repeating units, preferably 16 to 24 ethylene glycol repeating units, more preferably between 18 and 22 repeating units. At least one of the ethylene glycol substituents in the ethoxylated sorbitan ester is connected via an ester bond to a fatty acid moiety. Preferably, at least two of the ethylene glycol substituents in the ethoxylated sorbitan ester are connected via an ester bond to a fatty acid moiety; more preferably at least three of the ethylene glycol substituents are connected via an ester bond to a fatty acid moiety. The fatty acid moieties can be saturated or unsaturated and can contain 10 to 30 carbon atoms, preferably 16 to 22 carbon atoms. Examples of these fatty acid moieties are oleate, laureate, stearate and palmitate. Most preferred are ethoxylated sorbitan esters comprising four polyethylene glycol substituents and wherein the ester comprises between 18 and 22 ethylene glycol repeating units and wherein three of the ethylene glycol substituents are connected to oleate, laurate or stearate groups. Examples of ethoxylated sorbitan esters are polyoxyethylene (20) sorbitane monolaurate, polyoxyethylene (20) sorbitane dilaurate, polyoxyethylene (20) sorbitane trilaurate, polyoxyethylene (20) sorbitane monooleate, polyoxyethylene (20) sorbitane di-oleate, polyoxyethylene (20) sorbitane tri-oleate, polyoxyethylene (20) sorbitane monostearate, polyoxyethylene (20) sorbitane distearate and polyoxyethylene (20) sorbitane tristearate.

The compound C is present in the pigment masterbatch in an amount of 1.5-20 wt %, wherein the wt % are relative to the total weight of the masterbatch, preferably the amount of ethoxylated sorbitan ester in the masterbatch is 2-10 wt %, more preferably 2.5-6 wt %.

The pigment masterbatch according to the invention can comprise a polymeric compound D. Examples of polymeric compounds are polyolefins, for example polyethylene, polypropylene and polyethylene waxes; elastomers; silicone rubbers; polyurethanes; polyamides, such as polyamide 6, polyamide 66, or polyamide 46; polyesters, such as polyethylene terephthalate and polybutylene terephthalate; polycarbonates; polyphenylene sulphide; ethylene vinyl acetate (EVA), ethylene methyl acrylate (EMA), and polyvinylbutyral (PVB) including blends and copolymers thereof. Polyethylene waxes are homo or copolymers of ethylene defined by a density range of 0.880-0.915 g/cm$^3$ The amount of polymeric compound D in the pigment masterbatch preferably is 0-50 wt % based on the total weight of the pigment masterbatch. More preferably, the amount of polymeric compound D is 1-45 wt %; most preferably 2-40 wt %.

The pigment masterbatch can also comprise other ingredients. Examples of these ingredients are dispersing agents, fillers and polymeric compounds. The function of a dispersing agent is to significantly reduce the viscosity of a dispersion. The amount of dispersing agent in the pigment masterbatch preferably is 0-5 wt % based on the total weight of the pigment masterbatch. More preferably, the amount of dispersing agent is 2-4 wt %.

A filler can be used to raise the amount of solids in the pigment masterbatch The fillers may be of natural or synthetic, mineral or non-mineral origin. Examples of fillers include clays, nanoclays, wood flour silica, glass, metals, inorganic oxides, oxides of metals, hydroxides of aluminum or ammonium or magnesium, carbonates of alkali and alkaline earth metals antimony trioxide, calcium silicate, diatomaceous earth, fuller earth, kieselguhr, mica, talc, slate flour, volcanic ash, cotton flock, asbestos, kaolin, alkali and alkaline earth metal sulfates (such as sulfates of barium and calcium sulfate, titanium, zeolites, wollastonite, titanium boride, zinc borate, tungsten carbide, ferrites, molybdenum disulfide, asbestos, cristobalite, aluminosilicates and combinations comprising at least one of the foregoing fillers. Preferably, talc is used as a filler. Talc is a relatively abundant, inexpensive, highly hydrophobic and generally unreactive mineral. It can be categorized as a hydrated magnesium silicate and its main components can be represented by, inter alia, one or more of the formulas $(Si_2O_5)_2Mg_3(OH)_2$, $Si_8Mg_6O_{20}(OH)_4$ or $Mg_{12}Si_{16}O_{40}(OH)_8$. As used in the pigment masterbatch according to the invention, 'talc' refers to both natural and synthetic talc.

Talc is available in several particle sizes, for example the particle sizes of talc are classified as 'ultrafine' (average particle size of lower than 1 μm, for example an average particle size in the range of 0.3 to 0.9 μm) and 'fine' (average particle size of at least 1 μm, for example an average particle size of 1 μm to 5 μm). Preferably, fine or ultrafine talc is used in the process of the present invention.

The amount of filler in the pigment masterbatch is 0-20 wt % based on the total weight of the pigment masterbatch. Preferably, the amount of filler is 2-18 wt %; more preferably 5-15 wt %.

According to one preferred embodiment of the invention the pigment masterbatch comprises
a) 40-80 wt % of at least one pigment;
b) 5-15 wt % of compound A, wherein compound A is chosen from triethylcitrate, tributylcitrate, trihexylcitrate, acetyltrietributylcitrate, propanoyltributylcitrate, acetyltrihexylcitrate or butanoyltriethylcitrate;
c) 2-5 wt % of compound B, wherein compound B is chosen from ethylenebisstearamide, ethylenebislaureamide or ethylenebisoleamide;
d) 2.5-6 wt % of an ethoxylated sorbitan ester wherein the ester is substituted with four polyethylene glycol substituents, wherein the ester comprises between 18 and 22 ethylene glycol repeating units and wherein three of the ethylene glycol substituents are connected to oleate, stearate or laurate groups; and
e) 1-40 wt % of a polymeric compound D.

The invention is further directed a process for the preparation of a pigment masterbatch by mixing the at least one pigment, compound A, compound B, the ethoxylated sorbitan ester and optionally polymeric compound D. Mixing of the filler with the other ingredients can be performed in commonly used mixing devices to provide a homogeneous pigment masterbatch. Commonly used mixing devices are blenders, for example V blender, ribbon blender or a cone blender; mixers, for example a jet mixer, a planetary mixer or a Banbury mixer; or extruders.

The temperature during mixing can be between 100 and 250° C.

The invention is also directed to the use of the pigment masterbatch for coloring a polymer composition. The advantage of the pigment masterbatch according to the invention is that a very homogeneous polymer composition can be obtained in high yield. Also with a single masterbatch, different types of polymer compositions (for example polyolefins, PVC and polyesters) can be colored. This can have many advantages. For example, when articles comprise more than one type of polymer in the polymer composition, the coloring of the article can be performed with a single pigment masterbatch. This is more efficient, gives more stable and simple production processes and uniform colored articles can be obtained.

To obtain a colored polymer composition any amount (like for example 0.001-10 wt %) of the masterbatch according to the invention can be added to a polymer composition. The polymer composition preferably is thermoplastic. Examples of thermoplastic polymers compositions are polymethylacrylate, polymethylmethacrylate, polyimide, polyolefins (polyethylenes, polypropylene, polybutylene), polystyrene, polyvinylchloride, polytetrafluoroethylene, thermoplastic vulcanizates (TPV), polyesters, polyurethane, and thermoplastic polyimides. Preferably, an amount of between 0.01 wt % and 10 wt % of the masterbatch is added to the polymer composition.

The invention is also directed to a process for the preparation of a colored polymer composition comprising mixing polymer composition and the pigment masterbatch in processing equipment. These procedures are known to the skilled man.

The invention also relates to a colored polymer composition comprising between 0.001 wt % and 10 wt % of the pigment masterbatch according to the invention.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims.

It is noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

The invention will now be elucidated by way of the following examples without however being limited thereto.

EXAMPLES

A test procedure has been set up to prepare masterbatches, and to prepare a test piece. A pigment masterbatch is prepared containing pigment, additives and a polypropylene copolymer (INEOS). This pigment masterbatch is diluted in a first step by providing 10 weight % of the pigment masterbatch with 90 weight % of the target polymer, using a ZSK extruder (L/D 40) to make a pigment blend.

After this first dilution step, 2 wt % of the pigment blend is added to 98 wt % of target polymer to prepare a test piece through injection molding. The test piece (3×3 cm) has a thickness of 1 mm. The dispersion of pigment in the test piece can be visually determined by looking through the thin test piece against a light background.

The test results are rated as follows:

TABLE 1.0

| Rating | Interpretation | Flow lines |
|---|---|---|
| 0 | Excellent | None; homogeneous |
| 1 | Reasonable | Few lines |
| 2 | Bad | Clearly visible flow lines |
| 3 | Very bad | Heterogeneous test piece |

Experiment 1

A pigment masterbatch is prepared using 80 wt % of Red pigment 48:2, 20 wt % of polypropylene copolymer (IN-EOS) and varying amount of additives.

The additives that are used are:

acetyltributylcitrate (ATBC), ethylenebislauramide (EBL) and sorbitane polyoxyethylene (20) trioleate (SPT).

After making the pigment masterbatch in a compounder, the pigment masterbatch is diluted with polypropylene copolymer (INEOS) (10:90 wt ratio) to make the pigment blend. This pigment blend is injection moulded with the polypropylene copolymer (PP) (2:98 wt ratio) to make a test piece. Testpieces are inspected for the presence of flow lines.

Pigment masterbatch compositions and test results of the test pieces are shown in table 1.1.

TABLE 1.1

| Red 48:2 (wt %) | PP (wt %) | ATBC (wt %) | EBC (wt %) | SPT (wt %) | Rating |
|---|---|---|---|---|---|
| 80 | 20 | — | — | — | 3 |
| 80 | 20 | 5 | — | — | 2 |
| 80 | 20 | — | 5 | — | 3 |
| 80 | 20 | — | — | 5 | 3 |
| 80 | 20 | 5 | 5 | 5 | 0 |

The experiment shows that addition of a single additive has no or a minimal effect on the improvement of flow lines in the test piece. Surprisingly, the combination of 3 additives gives a strong improvement on creating a homogeneous dispersion of the pigment in the test piece.

Experiment 2

A pigment masterbatch having an olive green color is prepared with a pigment which is a combination of 32% PW 6 (white), 1.3% PBK 7 (black), 52% PY 155 (yellow) and 1.25% PG 7 (green).

Further the pigment masterbatch contains 20 wt % polypropylene copolymer (INEOS), and varying amounts of additives (tributylcitrate, ethylenebislauramide, sorbitan polyoxyethylene (20) trioleate).

The pigment masterbatch is diluted into a pigment blend using either polypropylene (PP), PVC or PET. Test pieces are prepared with further dilution with PP, PVC and PET (respectively) and visually inspected.

The results are summarized in tables 2.1, 2.2 and 2.3.

TABLE 2.1

| Polymer PP | | | | | |
|---|---|---|---|---|---|
| Pigment (wt %) | PP (wt %) | TBC (wt %) | EBL (wt %) | SPT (wt %) | Rating |
| 80 | 20 | 5 | 2.5 | 6 | 0 |
| 80 | 20 | 5 | — | 6 | 1 |
| 80 | 20 | — | 2.5 | 6 | 2 |
| 80 | 20 | 5 | 2.5 | — | 1 |
| 80 | 20 | — | 2.5 | — | 2 |
| 80 | 20 | — | — | — | 2 |

TABLE 2.2

| Polymer PVC | | | | | |
|---|---|---|---|---|---|
| Pigment (wt %) | PVC (wt %) | TBC (wt %) | EBL (wt %) | SPT (wt %) | Rating |
| 80 | 20 | 5 | 2 | 5 | 0 |
| 80 | 20 | — | 2 | 5 | 3 |
| 80 | 20 | 5 | — | — | 2 |
| 80 | 20 | 5 | 2 | — | 2 |
| 80 | 20 | — | — | — | 3 |

TABLE 2.3

| Polymer PET | | | | | |
|---|---|---|---|---|---|
| Pigment (wt %) | PET (wt %) | TBC (wt %) | EBL (wt %) | SPT (wt %) | Rating |
| 80 | 20 | 5 | 2 | 4 | 0 |
| 80 | 20 | 5 | — | — | 2 |
| 80 | 20 | 5 | 2 | — | 1 |
| 80 | 20 | — | 2 | 4 | 2 |

The experiments in tables 2.1, 2.2 and 2.3 also show that addition of a single additive has no or a minimal effect on the improvement of flow lines in the test pieces. Surprisingly, the combination of 3 additives gives a strong improvement on creating a homogeneous dispersion of the pigment in the test pieces comprising three different types of target polymer compositions.

Also different polymers compositions can be blended with one single masterbatch to obtain excellent colored polymer compositions.

What is claimed is:

1. A pigment masterbatch, comprising:
a. 30-95 wt % of at least one pigment,
b. 2-30 wt % of a compound A according to formula I,

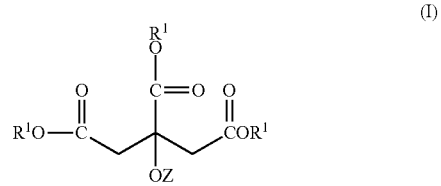

(I)

wherein $R^1$ is an alkyl group comprising 1-20 carbon atoms and Z is hydrogen or a group according to the formula $C(O)R^2$, wherein $R^2$ is an alkyl group comprising 1-20 carbon atoms, c. 1.0-10 wt % of a compound B according to formula $C_2H_4(NHC(O)R^3)_2$, wherein $R^3$ is a fatty acid moiety comprising 10-30 carbon atoms, and d. 1.5-20 wt % of a compound C, which contains at least one polyethyleneglycol moiety and at least one fatty acid moiety coupled to the polyethyleneglycol moiety, e. 0-50 wt % of a polymeric compound D, and wherein the wt % are relative to the total weight of the pigment masterbatch.

2. The pigment masterbatch according to claim 1, wherein the compound A is one or more of triethylcitrate, tributylcitrate, trihexylcitrate, acetyltributylcitrate, propanoyltributylcitrate, acetyltrihexylcitrate and butanoyltriethylcitrate.

3. The pigment masterbatch according to claim 1, wherein $R^3$ is a fatty acid moiety chosen from one or more of oleate, laureate, stearate and palmitate.

4. The pigment masterbatch according to claim 1, wherein the compound B is chosen from one or more of ethylenebisstearamide, ethylenebislaureamide and ethylenebisoleamide.

5. The pigment masterbatch according to claim 1, wherein the compound C comprises between 5 and 25 ethyleneglycol repeating units and the fatty acid moiety comprises 10-30 carbon atoms.

6. The pigment masterbatch according to claim 5, wherein the fatty acid moiety is chosen from one or more of oleate, laureate, stearate, palmitate and ricinoleate.

7. The pigment masterbatch according to claim 1, wherein the compound C is an ethoxylated sorbitan ester.

8. The pigment masterbatch according to claim 7, wherein the ethoxylated sorbitan ester comprises between 14 and 26 ethylene glycol repeating units.

9. The pigment masterbatch according to claim 8, wherein at least two of the ethylene glycol substituents in the ethoxylated sorbitan ester are connected via an ester bond to a fatty acid moiety.

10. The pigment masterbatch according to claim 9, wherein the fatty acid moiety is chosen from one or more of oleate, laureate, stearate and palmitate.

11. The pigment masterbatch according to claim 1, wherein the amount of the polymeric compound D is 1-45 wt %.

12. The pigment masterbatch according to claim 1 comprising:

a. 40-80 wt % of the at least one pigment;

b. 5-15 wt % of the compound A, wherein the compound A is chosen from triethylcitrate, tributylcitrate, trihexylcitrate, acetyltrietributylcitrate, propanoyltributylcitrate, acetyltrihexylcitrate or butanoyltriethylcitrate;

c. 2-5 wt % of the compound B, wherein the compound B is chosen from ethylenebisstearamide, ethylenebislaureamide or ethylenebisoleamide;

d. 2.5-6 wt % of an ethoxylated sorbitan ester, wherein the ester is substituted with four polyethyleneglycol substituents, wherein the ester comprises between 18 and 22 ethylene glycol repeating units and wherein three of the ethylene glycol substituents are connected to oleate, stearate or laurate groups; and e. 1-40 wt % of the polymeric compound D.

13. A method for coloring a polymer composition, comprising the step of:

adding the pigment masterbatch according to claim 1 to a polymer composition.

14. A colored polymer composition, comprising: a polymer composition and between 0.001 wt % and 10 wt % of the pigment masterbatch according to claim 1.

15. The pigment masterbatch according to claim 2, wherein $R^3$ is a fatty acid moiety chosen from one or more of oleate, laureate, stearate and palmitate.

16. The pigment masterbatch according to claim 2, wherein the compound B is chosen from one or more of ethylenebisstearamide, ethylenebislaureamide and ethylenebisoleamide.

17. The pigment masterbatch according to claim 8, wherein the ethoxylated sorbitan ester comprises between 16 to 24 ethylene glycol repeating units.

18. The pigment masterbatch according to claim 8, wherein the ethoxylated sorbitan ester comprises between 18 to 22 ethylene glycol repeating units.

19. The pigment masterbatch according to claim 11, wherein the amount of the polymeric compound D is 2-40 wt %.

* * * * *